(12) United States Patent
Zhang et al.

(10) Patent No.: US 11,788,519 B2
(45) Date of Patent: *Oct. 17, 2023

(54) TURBINE FRACTURING EQUIPMENT

(71) Applicant: Yantai Jereh Petroleum Equipment & Technologies Co., Ltd., Yantai (CN)

(72) Inventors: Rikui Zhang, Yantai (CN); Yipeng Wu, Yantai (CN); Chunqiang Lan, Yantai (CN); Xincheng Li, Yantai (CN); Xiance Li, Yantai (CN); Sheng Chang, Yantai (CN); Xiaolei Ji, Yantai (CN); Zhuqing Mao, Yantai (CN)

(73) Assignee: Yantai Jereh Petroleum Equipment & Technologies Co., Ltd., Yantai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/531,817

(22) Filed: Nov. 22, 2021

(65) Prior Publication Data
US 2022/0082007 A1   Mar. 17, 2022

Related U.S. Application Data

(63) Continuation of application No. 16/832,191, filed on Mar. 27, 2020, now Pat. No. 11,242,737.

(30) Foreign Application Priority Data

Sep. 20, 2019 (CN) .......................... 201910894253.0

(51) Int. Cl.
*F04B 17/06* (2006.01)
*B62D 63/06* (2006.01)
(Continued)

(52) U.S. Cl.
CPC ............ *F04B 17/06* (2013.01); *B62D 63/068* (2013.01); *E21B 43/2607* (2020.05);
(Continued)

(58) Field of Classification Search
CPC .......... F04B 15/02; F04B 17/05; F04B 53/08; F01D 25/30; F16H 1/02; E21B 43/2607; B62D 63/068
See application file for complete search history.

(56) References Cited

U.S. PATENT DOCUMENTS 2,988,153 A   6/1961   Haworth et al.
3,418,485 A   12/1968  Anderson et al.
(Continued)

FOREIGN PATENT DOCUMENTS

CA   2944968      8/2016
CN   2625578 Y    7/2004
(Continued)

OTHER PUBLICATIONS

International Search Report, dated Jun. 5, 2020, pp. 1-4, issued in International Patent Application No. PCT/CN2019/107019, China Intellectual Property Administration, Beijing, China.
(Continued)

*Primary Examiner* — Charles G Freay
(74) *Attorney, Agent, or Firm* — Crowell & Moring LLP

(57) ABSTRACT

The present invention may disclose a turbine fracturing equipment, including a transporter, a turbine engine, a reduction gearbox, a transmission mechanism and a plunger pump, wherein an output end of the turbine engine may be connected to one end of the reduction gearbox, the other end of the reduction gearbox may be connected to the plunger pump through a transmission mechanism; the transporter may be used to support the turbine engine, the reduction gearbox, the transmission mechanism and the plunger pump; the transporter may include a chassis provided with a transport section, a bearing section and a lapping section which may be connected in sequence; while the turbine fracturing equipment may be in a working state, the bearing section can contact with the ground, while the turbine
(Continued)

fracturing equipment may be in a transport state, the bearing section may not contact with the ground.

17 Claims, 1 Drawing Sheet

(51) Int. Cl.
    *E21B 43/26*            (2006.01)
    *F01D 25/30*           (2006.01)
    *F04B 17/05*           (2006.01)
    *F16H 1/02*            (2006.01)
    *F04B 53/08*           (2006.01)
    *B62D 33/08*          (2006.01)
    *B62D 61/10*          (2006.01)
    *F04B 15/02*          (2006.01)

(52) U.S. Cl.
    CPC .............. *F01D 25/30* (2013.01); *F04B 17/05* (2013.01); *F04B 53/08* (2013.01); *F16H 1/02* (2013.01); *B62D 33/08* (2013.01); *B62D 61/10* (2013.01); *F04B 15/02* (2013.01); *F05D 2260/96* (2013.01)

(56) References Cited

U.S. PATENT DOCUMENTS

| | | |
|---|---|---|
| 3,791,682 A | 2/1974 | Mitchell |
| 3,881,841 A | 5/1975 | Straniti |
| 4,341,071 A | 7/1982 | Abo et al. |
| 5,435,975 A | 7/1995 | Bastos |
| 5,517,822 A | 5/1996 | Haws et al. |
| 5,709,076 A | 1/1998 | Lawlor |
| 6,230,481 B1 | 5/2001 | Jahr |
| 6,446,425 B1 | 9/2002 | Lawlor |
| 7,036,318 B1 | 5/2006 | Munson, Jr. |
| 7,506,574 B2 | 3/2009 | Jensen et al. |
| 7,552,903 B2 | 6/2009 | Dunn et al. |
| 7,845,413 B2 | 12/2010 | Shampine et al. |
| 8,567,354 B2 | 10/2013 | Kealy et al. |
| 8,621,873 B2 | 1/2014 | Robertson et al. |
| 8,801,394 B2 | 8/2014 | Anderson |
| 9,534,473 B2 | 1/2017 | Morris et al. |
| 10,030,579 B2 | 7/2018 | Austin et al. |
| 10,060,293 B2 | 8/2018 | Del Bono |
| 10,371,012 B2 | 8/2019 | Davis et al. |
| 10,815,764 B1 | 10/2020 | Yeung |
| 10,954,770 B1 | 3/2021 | Yeung et al. |
| 10,961,993 B1 | 3/2021 | Ji et al. |
| 10,968,837 B1 | 4/2021 | Yeung et al. |
| 11,111,768 B1 | 9/2021 | Yeung et al. |
| 11,181,046 B1 | 11/2021 | Brooks et al. |
| 11,242,737 B2 * | 2/2022 | Zhang .................... B62D 33/08 |
| 11,499,405 B2 | 11/2022 | Zhang |
| 11,519,395 B2 | 12/2022 | Zhang |
| 2003/0004029 A1 | 1/2003 | Lagarde et al. |
| 2003/0171184 A1 | 9/2003 | Wige |
| 2004/0050049 A1 | 3/2004 | Wendt et al. |
| 2005/0221946 A1 | 10/2005 | Mitrovic |
| 2007/0213171 A1 | 9/2007 | Pizzichil et al. |
| 2007/0277982 A1 | 12/2007 | Shampine et al. |
| 2009/0068031 A1 | 3/2009 | Gambier et al. |
| 2010/0071899 A1 | 3/2010 | Coquilleau et al. |
| 2011/0085924 A1 | 4/2011 | Shampine et al. |
| 2011/0171044 A1 | 7/2011 | Flanigan |
| 2013/0112029 A1 | 5/2013 | Slayter et al. |
| 2013/0209236 A1 | 8/2013 | Xu |
| 2014/0144641 A1 | 5/2014 | Chandler |
| 2014/0174717 A1 | 6/2014 | Broussard et al. |
| 2014/0219824 A1 | 8/2014 | Burnette |
| 2014/0274557 A1 | 9/2014 | Chong |
| 2015/0184591 A1 | 7/2015 | Giancotti et al. |
| 2015/0247421 A1 | 9/2015 | Wojick et al. |
| 2015/0252661 A1 | 9/2015 | Glass |
| 2015/0275891 A1 | 10/2015 | Chong |
| 2015/0377318 A1 | 12/2015 | Byrne |
| 2015/0381013 A1 | 12/2015 | Davies et al. |
| 2016/0047305 A1 | 2/2016 | Wickert et al. |
| 2016/0102581 A1 | 4/2016 | Del Bono |
| 2016/0169322 A1 | 6/2016 | Ono |
| 2016/0177678 A1 | 6/2016 | Morris et al. |
| 2016/0218650 A1 | 7/2016 | Gajanayake et al. |
| 2016/0230525 A1 | 8/2016 | Lestz et al. |
| 2016/0341124 A1 | 11/2016 | Ross et al. |
| 2016/0348479 A1 | 12/2016 | Oehring et al. |
| 2017/0082110 A1 | 3/2017 | Lammers |
| 2017/0089189 A1 | 3/2017 | Norris et al. |
| 2017/0104389 A1 | 4/2017 | Morris et al. |
| 2017/0218727 A1 | 8/2017 | Oehring et al. |
| 2017/0234308 A1 | 8/2017 | Buckley |
| 2017/0292789 A1 | 10/2017 | Hjorth et al. |
| 2018/0111807 A1 | 4/2018 | Snider |
| 2018/0266412 A1 | 9/2018 | Stokkevag et al. |
| 2018/0283464 A1 | 10/2018 | Altamura |
| 2019/0063309 A1 | 2/2019 | Davis |
| 2019/0067991 A1 | 2/2019 | Davis et al. |
| 2019/0068026 A1 | 2/2019 | Davis |
| 2019/0178235 A1 | 6/2019 | Coskrey et al. |
| 2019/0338762 A1 | 11/2019 | Curry et al. |
| 2020/0040878 A1 | 2/2020 | Morris |
| 2020/0049136 A1 | 2/2020 | Stephenson |
| 2020/0056458 A1 | 2/2020 | Mao et al. |
| 2020/0109616 A1 | 4/2020 | Oehring et al. |
| 2020/0325761 A1 | 10/2020 | Williams |
| 2020/0332784 A1 | 10/2020 | Zhang et al. |
| 2020/0340344 A1 | 10/2020 | Reckels et al. |
| 2020/0370633 A1 | 11/2020 | Kumar |
| 2020/0392826 A1 | 12/2020 | Cui et al. |
| 2021/0025383 A1 | 1/2021 | Bodishbaugh |
| 2021/0079902 A1 | 3/2021 | Yeung et al. |
| 2021/0102531 A1 | 4/2021 | Bodishbaugh et al. |
| 2021/0372256 A1 | 12/2021 | Yeung et al. |
| 2021/0404309 A1 | 12/2021 | Yeung et al. |

FOREIGN PATENT DOCUMENTS

| | | |
|---|---|---|
| CN | 201159100 Y | 12/2008 |
| CN | 201646518 U | 11/2010 |
| CN | 201863895 U | 6/2011 |
| CN | 102602323 A | 7/2012 |
| CN | 202673269 U | 1/2013 |
| CN | 202763319 U | 3/2013 |
| CN | 202926404 U | 5/2013 |
| CN | 202935216 U | 5/2013 |
| CN | 203962367 U | 11/2014 |
| CN | 105065224 A | 11/2015 |
| CN | 205117343 U | 3/2016 |
| CN | 105545666 A | 5/2016 |
| CN | 105703535 A | 6/2016 |
| CN | 106089175 A | 11/2016 |
| CN | 107208557 A | 9/2017 |
| CN | 107939342 A | 4/2018 |
| CN | 208862781 U | 5/2019 |
| CN | 109869294 A | 6/2019 |
| CN | 109882144 A | 6/2019 |
| CN | 109906305 A | 6/2019 |
| CN | 110118127 A | 8/2019 |
| CN | 110145399 A | 8/2019 |
| CN | 110374745 A | 10/2019 |
| CN | 110469314 A | 11/2019 |
| CN | 110469405 A | 11/2019 |
| CN | 110500255 A | 11/2019 |
| CN | 110513097 A | 11/2019 |
| CN | 209586278 U | 11/2019 |
| CN | 209586287 U | 11/2019 |
| CN | 110735713 A | 1/2020 |
| CN | 110821464 A | 2/2020 |
| CN | 210714958 U | 6/2020 |
| CN | 111594314 A | 8/2020 |
| CN | 112682172 A | 4/2021 |
| FR | 2890438 A1 | 3/2013 |

(56) References Cited

FOREIGN PATENT DOCUMENTS

KR          101861753 B1     5/2018
WO    WO 2019/204323 A1    10/2019

OTHER PUBLICATIONS

International Search Report, dated Jun. 5, 2020, pp. 1-4, issued in International Patent Application No. PCT/CN2019/107020, China Intellectual Property Administration, Beijing, China.
International Search Report, dated Jun. 5, 2020, pp. 1-4, issued in International Patent Application No. PCT/CN2019/107021, China Intellectual Property Administration, Beijing, China.
International Search Report, dated Jun. 10, 2020, pp. 1-4, issued in International Patent Application No. PCT/CN2019/107023, China Intellectual Property Administration, Beijing, China.
International Search Report, dated May 14, 2020, pp. 1-4, issued in International Patent Application No. PCT/CN2019/107026, China Intellectual Property Administration, Beijing, China.
International Search Report, dated Sep. 26, 2021, pp. 1-4, issued in International Patent Application No. PCT/CN2019/095646, China Intellectual Property Administration, Beijing, China.
Non-final Office Action dated Apr. 6, 2023 for U.S. Appl. No. 17/886,221.
Non-final Office Action dated Apr. 11, 2023 for U.S. Appl. No. 18/047,863.

* cited by examiner

TURBINE FRACTURING EQUIPMENT

CROSS-REFERENCE TO RELATED APPLICATIONS

The present disclosure is a continuation of U.S. application Ser. No. 16/832,191, filed Mar. 27, 2020, which claims priority to Chinese Application No. 201910894253.0, filed Sep. 20, 2019, the entire contents of each are incorporated herein by reference.

TECHNICAL FIELD

The present invention relates to the field of operation in oil and gas fields, and specifically to a turbine fracturing equipment.

BACKGROUND

In the working sites of fracturing in oil and gas fields all over the world, the driving modes for fracturing equipment mainly include the following two ways:

One driving mode is diesel engine driven, specifically a diesel engine is connected to a transmission through a transmission shaft to drive the fracturing plunger pump to work. In other words, a diesel engine is used as the power source, a transmission and a transmission shaft are used as the transmission devices, and a fracturing plunger pump is used as the actuating element.

This configuration mode has the following disadvantages:

(1) Large volume and heavy weight: When a diesel engine drives a transmission to drive a fracturing plunger pump through a transmission shaft, a large volume is occupied, a heavy weight is involved, the transportation is restricted, and the power density is low;

(2) Environmental problems: During operations on a well site, the fracturing equipment driven by the diesel engine would generate engine waste gas pollution and noise pollution. The noise exceeding 105 dBA will severely affect the normal life of nearby residents;

(3) Cost inefficiency: The fracturing equipment driven by the diesel engine requires relatively high initial purchase costs and incurs high fuel consumption costs for unit power during operation, and the engine and the transmission also require very high routine maintenance costs.

The other driving mode is electric drive fracturing, specifically an electric motor is connected to a transmission shaft or a coupling to drive the fracturing plunger pump to work. In other words, an electric motor is used as the power source, a transmission shaft or a coupling is used as the transmission device, and a fracturing plunger pump is used as the actuating element.

Although the electric drive fracturing has many advantages itself, the power supply on fracturing well sites is the prerequisite for implementation of electric drive fracturing. Generally, it is difficult to supply power for the fracturing well sites in that the power capacity on the well sites is too small to drive the whole fracturing unit, or there are not any power networks at all on the well sites. Therefore, in common electric drive fracturing sites, generators are generally used to generate electricity. The most economical generation fuel is natural gas, but the users employing natural gas need to rent or purchase gas generator sets. For a fracturing well site without power networks, the power of the gas generator sets needs up to at least 30 MW. Purchasing such high-power gas generator sets is a great investment for customers. More importantly, in actual work progress, the accidental shutdown of the gas generator sets would cause the breakdown of the whole electric drive fracturing unit, thus seriously affecting the working quality, even causing work accidents possibly.

Therefore, there is an urgent need for a new fracturing equipment to solve the disadvantages of the above existing diesel engine-driven fracturing and electric drive fracturing, thus better satisfying the demands on the oil and gas field fracturing market globally.

SUMMARY

To overcome the deficiencies in the prior art, an objective of the present invention is to provide a turbine fracturing equipment, which adopts a linear connection of the whole equipment and a special chassis design, so that the center of gravity is double lowered to guarantee its stability and safety, the structure is simpler, the investment and operation costs are decreased, the risk of total breakdown of the fracturing site is reduced, and the equipment has a good transmission performance and is suitable for continuous operation conditions with long time and heavy load.

The objective of the present invention is achieved by the following technical measures: a turbine fracturing equipment, including a transporter, a turbine engine, a reduction gearbox, a transmission mechanism or transmitter, and a plunger pump, wherein an output end of the turbine engine is connected to one end of the reduction gearbox, the other end of the reduction gearbox is connected to the plunger pump through the transmission mechanism, the transporter is used to support the turbine engine, the reduction gearbox, the transmission mechanism and the plunger pump; the transporter includes a chassis provided with a transport section, a bearing section and a lapping section which are connected in sequence; while the turbine fracturing equipment is in a working state, the bearing section of the chassis can contact with the ground, while the turbine fracturing equipment is in a transport state, the bearing section of the chassis does not contact with the ground.

Further, the transporter includes wheels and axles, the wheels are disposed at both ends of the axles, the axles are connected to the chassis, and the number of the axles is 3 or above.

Further, the axles are disposed at the transport section of the chassis.

Further, while the turbine fracturing equipment is in the working state, the bottom of the bearing section of the chassis is at the same level as the bottom of the wheels.

Further, while the turbine fracturing equipment is in the transport state, the lapping section assists in transporting the transporter under the action of an external towing force.

Further, the bottom of the lapping section is provided with a bevel which is provided with a bulge, while the turbine fracturing equipment is in the transport state, the bevel can be used in conjunction with external towing equipment, the bulge assists in fixing the transporter and preventing the transporter from separating from the external towing equipment.

Further, the turbine engine is provided with an exhaust system on an opposite side of the reduction gearbox, the exhaust system includes an exhaust silencer and an exhaust duct, the exhaust silencer is connected to an exhaust port of the turbine engine through the exhaust duct.

Further, the exhaust system, the turbine engine, the reduction gearbox, the transmission mechanism and the plunger pump are disposed in a straight line along the transmission direction of power.

Further, the transmission mechanism is a transmission shaft or a coupling.

Further, a hydraulic power unit is disposed on the transport section, the hydraulic power unit drives the hydraulic system on the turbine fracturing equipment.

Further, the hydraulic power unit is driven by a diesel engine or driven by an electric motor.

Further, a cooling system is disposed on the transport section, the cooling system cools the oil used on the turbine fracturing equipment.

Further, the power of the plunger pump is 5000 hp or above.

Compared with the prior art, the present invention has the following beneficial effects: the turbine engine, the reduction gearbox, the transmission mechanism and the plunger pump are connected in a straight line along the transmission direction of power to avoid excessive transmission loss, thus ensuring efficient transmission performance. The turbine engine itself has the advantages of small volume, light weight and high power density. For the same size and weight, the unit-power of a turbine fracturing equipment is more than twice that of conventional diesel fracturing equipment. The turbine engine can be fueled by 100% natural gas directly, greatly reducing the use cost compared with the diesel consumption in diesel drive and the investment on gas generator sets of electric drive fracturing equipment. Meanwhile, the turbine fracturing equipment are usually operated with the plunger pumps drived one-to-one, unlike in electric drive fracturing equipment, a single high-power gas generator set is used to drive multiple plunger pumps. That is to say, a turbine fracturing equipment is employed to distribute the failure risk of a single high-power gas generator onto each turbine fracturing equipment, avoiding that the failure of a single gas generating equipment causes the risk of breakdown of the whole set of fracturing equipment. The special chassis design of the transporter allows the center of gravity of the whole equipment is further lowered on the basis of lowering the center of gravity by a linear connection, so that the stability and safety of the whole equipment are further enhanced no matter in a transport state or in a working state.

The present invention will be described in detail below with reference to the accompanying drawings and specific implementations.

Wherein, 1. hydraulic power unit, 2. transporter, 3. exhaust silencer, 4. exhaust duct, 5. turbine engine, 6. reduction gearbox, 7. transmission mechanism, 8. plunger pump, 9. tractor, 10. bevel, 11. bulge, 12. horizontal surface, 13. slope surface, and 14. diesel engine.

DESCRIPTION OF THE EMBODIMENTS

Figure 1:
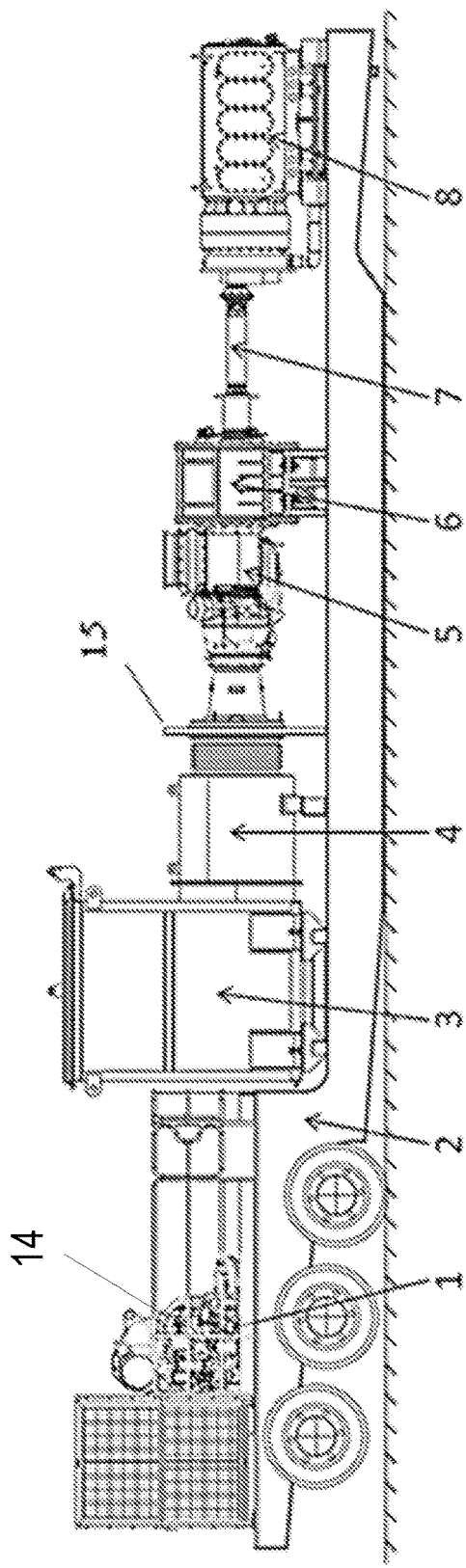
FIG. 1 is a schematic structural diagram of a turbine fracturing equipment while in a working state.
Figure 2:
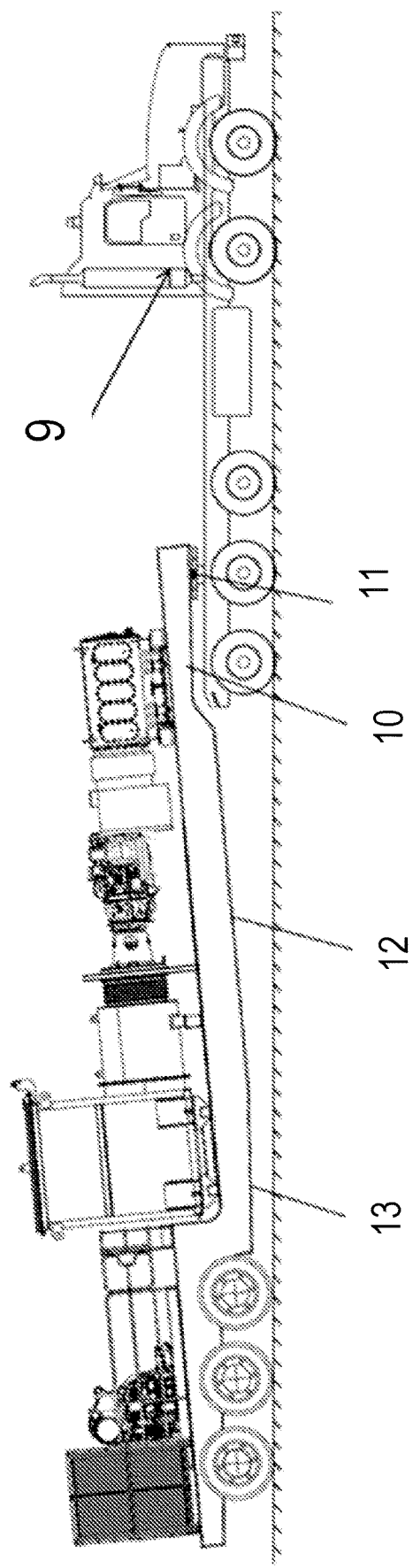
FIG. 2 is a schematic structural diagram of a turbine fracturing equipment while in a transport state.

As shown in FIGS. 1 to 2, a turbine fracturing equipment, including a transporter 2, a turbine engine 5, a reduction gearbox 6, a transmission mechanism 7 and a plunger pump 8, wherein the turbine engine 5 is the power source for the power transmission system of the whole equipment, an output end of the turbine engine 5 is connected to one end of the reduction gearbox 6, the other end of the reduction gearbox 6 is connected to the plunger pump 8 through the transmission mechanism 7; the transporter 2 is used to support the turbine engine 5, the reduction gearbox 6, the transmission mechanism 7 and the plunger pump 8; the transporter 2 includes a chassis provided with a transport section, a bearing section and a lapping section which are connected in sequence; while the turbine fracturing equipment is in a working state, the bearing section of the chassis can contact with the ground, while the turbine fracturing equipment is in a transport state, the bearing section of the chassis does not contact with the ground. The chassis is further provided with components such as battery wires, a fuel tank, a lubricating oil tank, a hydraulic oil tank and the like, providing oil and support for the up-loading components such as the turbine engine 5, the reduction gearbox 6, the plunger pump 8 and the like. The reduction gearbox 6 is used to slow down and increase the torque of the power output of the turbine engine 5, and then drives the plunger pump 8 to work through the transmission mechanism 7.

In one embodiment, as shown in FIG. 1, the turbine fracturing equipment further includes a vertical support 15 between the exhaust duct and the turbine engine, wherein the vertical support 15 stands on and in direct physical contact with a top surface of the chassis.

The transporter 2 includes wheels and axles, the wheels are disposed at both ends of the axles, the axles are connected to the chassis, and the number of the axles is 3 or above, to ensure an adequate bearing capacity.

The axles are disposed at the transport section of the chassis.

While the turbine fracturing equipment is in the working state, the bottom of the bearing section of the chassis is at the same level as the bottom of the wheels. The bottom itself of the bearing section is a horizontal surface 12 plus a slope surface 13, while in the working state, the horizontal surface 12 at the bottom of the bearing section fully contact with the ground, increasing the stability of the equipment in operations. The slope surface 13 allows the raised chassis to be lifted off the ground for easy walking when the turbine fracturing equipment is in a transport state.

While the turbine fracturing equipment is in the transport state, the lapping section assists in transporting the transporter 2 under the action of an external towing force.

The bottom of the lapping section is provided with a bevel 10 which is provided with a bulge 11. While the turbine fracturing equipment is in the transport state, the bevel 10 can be used in conjunction with external towing equipment, the bulge 11 assists in fixing the transporter 2 and preventing the transporter 2 from separating from the external towing equipment. The external towing equipment may be a tractor 9 and the like, and the bulge may be a traction pin.

The turbine engine 5 is provided with an exhaust system on an opposite side of the reduction gearbox 6. The exhaust system includes an exhaust silencer 3 and an exhaust duct 4, the exhaust silencer 3 is connected to an exhaust port of the turbine engine 5 through the exhaust duct 4. The exhaust duct 4 is used to direct the exhaust of the turbine engine 5 into the exhaust silencer 3, which can reduce the noise of the exhaust.

The exhaust system, the turbine engine 5, the reduction gearbox 6, the transmission mechanism 7 and the plunger pump 8 are disposed in a straight line along the transmission direction of power. The linear connection of the turbine engine 5, the reduction gearbox 6, the transmission mechanism 7 and the plunger pump 8 along the transmission direction of power can avoid excessive transmission loss, thus ensuring efficient transmission performance. The turbine engine 5 itself has the advantages of small volume, light weight and high power density. For the same size and weight, the unit-power of a turbine fracturing equipment is more than twice that of conventional diesel fracturing equipment. The turbine engine 5 can be fueled by 100% natural gas directly, greatly reducing the use cost compared with the diesel consumption in diesel drive and the investment on gas generator sets of electric drive fracturing equipment. Of course, the turbine engine 5 can also use 100% fuel oil as the fuel, preferably natural gas, which can reduce more fuel costs than fuel oil. Meanwhile, the turbine fracturing equipment are usually operated with the plunger pump 8 drived one-to-one, unlike in electric drive fracturing equipment, a single high-power gas generator set is used to drive multiple plunger pumps. That is to say, a turbine fracturing equipment is employed to distribute the failure risk of a single high-power gas generator onto each turbine fracturing equipment, avoiding that the failure of a single gas generating equipment causes the risk of breakdown of the whole set of fracturing equipment.

The transmission mechanism 7 is a transmission shaft or a coupling.

A hydraulic power unit 1 is disposed on the transport section, the hydraulic power unit 1 is used to drive the hydraulic system on the turbine fracturing equipment. The hydraulic system includes a hydraulic pump, a hydraulic motor, various valves, a hydraulic oil tank, a hydraulic oil radiator, and the like, (the hydraulic system is mainly used to drive the fuel pump of the turbine engine 5, the starting motor of the turbine engine 5, the lubrication system at the power end of the plunger pump 8, the lubrication system of the reduction gearbox 6, and various oil radiators, and the like).

The hydraulic power unit 1 is driven by a diesel engine or driven by an electric motor.

A cooling system is disposed on the transport section, the cooling system cools the oil used on the turbine fracturing equipment. The oil used includes the engine oil for the turbine engine 5, hydraulic oil, the lubricating oil for the plunger pump 8, the lubricating oil for the reduction gearbox 6, and the like.

The power of the plunger pump 8 is 5000 hp or above, the higher the power of the plunger pump 8 is, the more suitable for lone-time and high-load continuous operation conditions.

It will be appreciated to persons skilled in the art that the present invention is not limited to the foregoing embodiments, which together with the context described in the specification are only used to illustrate the principle of the present invention. Various changes and improvements may be made to the present invention without departing from the spirit and scope of the present invention. All these changes and improvements shall fall within the protection scope of the present invention. The protection scope of the present invention is defined by the appended claims and equivalents thereof.

What is claimed is:

1. A turbine fracturing equipment, comprising a transporter, a turbine engine, a reduction gearbox, a transmitter and a plunger pump, wherein:
   an output end of the turbine engine is connected to one end of the reduction gearbox, another end of the reduction gearbox is connected to the plunger pump through the transmitter;
   the transporter is configured to support the turbine engine, the reduction gearbox, the transmitter and the plunger pump;
   one end of the transmitter is directly connected to the reduction gearbox and another end of the transmitter is directly connected to the plunger pump;
   the transmitter comprises a transmission shaft or a coupling;
   the transporter comprises a chassis provided with a transport section, a bearing section and a lapping section which are connected in sequence;
   a bottom of the bearing section comprises a horizontal surface plus a slope surface between the horizontal surface and the transport section;
   the slope surface has an upward slope in a direction from the horizontal surface to the transport section;
   under an operational state of the turbine fracturing equipment, the horizontal surface at the bottom of the bearing section is configured to contact with a flat ground and the slope surface at the bottom of the bearing section is configured to be above the flat ground;
   the bottom of the lapping section is provided with a bevel; and
   the plunger pump is disposed directly over the bevel of the lapping section of the transporter.

2. The turbine fracturing equipment according to claim 1, wherein the transporter is provided with a plurality of axles having wheels installed at each end of the axles, and the axles are connected to the chassis.

3. The turbine fracturing equipment according to claim 2, wherein the axles are disposed at the transport section of the chassis.

4. The turbine fracturing equipment according to claim 2, wherein while the turbine fracturing equipment is in transport state, the lapping section is configured to connect the transporter to an external tower.

5. The turbine fracturing equipment according to claim 4, wherein a bulge is provided with the bevel and configured to fix the transporter with the external tower in the transport state.

6. The turbine fracturing equipment according to claim 1, wherein an exhaust system is located on an end of the turbine engine opposite to the output end of the turbine engine connected to the reduction gearbox, the exhaust system comprises an exhaust silencer and an exhaust duct, and the exhaust silencer is connected to an exhaust port of the turbine engine through the exhaust duct.

7. The turbine fracturing equipment according to claim 2, wherein a hydraulic power source is disposed on the transport section, and the hydraulic power source is configured to drive a hydraulic system on the turbine fracturing equipment.

8. The turbine fracturing equipment according to claim 7, wherein the hydraulic power source is a diesel engine or an electric motor.

9. The turbine fracturing equipment according to claim 2, wherein a cooling system is disposed on the transport section, the cooling system being configured to cool oil used on the turbine fracturing equipment.

10. The turbine fracturing equipment according to claim 1, wherein a power of the plunger pump comprises 5000 hp.

11. The turbine fracturing equipment according to claim 2, wherein the horizontal surface at the bottom of the bearing section is configured to be at a same level as a surface of the wheels touching a ground under and operational state.

12. The turbine fracturing equipment according to claim 1, wherein under a transport state, the slope surface at the bottom of the bearing section is configured to enable the chassis to be lifted off the ground for transportation.

13. The turbine fracturing equipment according to claim 2, wherein the transporter comprises 3 axles.

14. The turbine fracturing equipment according to claim 1, wherein the turbine engine is directly connected to and in direct physical contact with the reduction gearbox.

15. The turbine fracturing equipment according to claim 1, wherein the turbine engine has a turbine engine housing, the reduction gearbox has a reduction gearbox housing, and the turbine engine housing is directly connected to and in direct physical contact with the reduction gearbox housing.

16. The turbine fracturing equipment according to claim 6, further comprising a vertical support between the exhaust duct and the turbine engine, wherein the vertical support stands on and in direct physical contact with a top surface of the chassis.

17. A turbine fracturing equipment, comprising a transporter, a turbine engine, a reduction gearbox, a transmitter and a plunger pump, wherein:
- an output end of the turbine engine is connected to one end of the reduction gearbox, another end of the reduction gearbox is connected to the plunger pump through the transmitter;
- the transporter is configured to support the turbine engine, the reduction gearbox, the transmitter and the plunger pump;
- one end of the transmitter is directly connected to the reduction gearbox and another end of the transmitter is directly connected to the plunger pump;
- the transmitter comprises of a transmission shaft or a coupling;
- the transporter comprises a chassis provided with a transport section, a bearing section and a lapping section which are connected in sequence, and a plurality of axles having wheels installed at each end of the axles, and the axles are connected to the chassis;
- a bottom of the bearing section comprises a horizontal surface plus a slope surface between the horizontal surface and the transport section;
- the slope surface has an upward slope in a direction from the horizontal surface to the transport section;
- under an operational state of the turbine fracturing equipment, the horizontal surface at the bottom of the bearing section is configured to contact with a flat ground and the slope surface at the bottom of the bearing section is configured to be above the flat ground; and
- from a top view, the plunger pump on the chassis is completely within the lapping section.

\* \* \* \* \*